US012535811B2

(12) United States Patent
Moyal et al.

(10) Patent No.: US 12,535,811 B2
(45) Date of Patent: Jan. 27, 2026

(54) STABILITY IN ARRANGEMENT OF PACKAGES DELIVERED BY DRONES

(71) Applicant: International Business Machines Corporation, Armonk, NY (US)

(72) Inventors: Shailendra Moyal, Pune (IN); Partho Ghosh, Kolkata (IN); Sathya Santhar, Ramapuram (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 18/098,645

(22) Filed: Jan. 18, 2023

(65) Prior Publication Data

US 2024/0241516 A1  Jul. 18, 2024

(51) Int. Cl.
*G06Q 10/083* (2024.01)
*B64U 10/14* (2023.01)
(Continued)

(52) U.S. Cl.
CPC ........... *G05D 1/0094* (2013.01); *B64U 10/14* (2023.01); *G05D 1/101* (2013.01); *G05D 1/104* (2013.01);
(Continued)

(58) Field of Classification Search
CPC .... B64U 10/14; B64U 2101/64; B64U 10/13; B64U 2101/67; G05D 1/0094;
(Continued)

(56) References Cited

U.S. PATENT DOCUMENTS 8,290,617 B2   10/2012  Ruge
9,550,561 B1 *  1/2017  Beckman ................. G05D 3/00
(Continued)

FOREIGN PATENT DOCUMENTS

CN        102633129 A      8/2012
KR      20210158150 A  * 12/2021   ............... E06B 9/15

OTHER PUBLICATIONS

Translation_of_KR20210158150A (Year: 2021).*
(Continued)

*Primary Examiner* — Hitesh Patel
(74) *Attorney, Agent, or Firm* — Shackelford, McKinley & Norton, LLP; Robert A. Voigt, Jr.

(57) ABSTRACT

A computer-implemented method, system and computer program product for ensuring stability in the arrangement of a pile of packages delivered by drones. Upon receipt of package information concerning packages to be delivered by multiple drones at the same destination within a duration of time, simulations are performed of stacking the packages using different approaches based on the received package information. Based on simulating the various ways of stacking the packages to be delivered at the destination, the optimal arrangement of stacking the packages at the destination in a particular order and in a particular manner by the drones within the duration of time that maximizes the stability in the resulting arrangement of the pile of packages is identified. The drones scheduled to deliver the packages to such a destination are then instructed to deliver such packages to the destination in such a particular order and in such a particular manner.

17 Claims, 7 Drawing Sheets

(51) Int. Cl.
*G05D 1/00* (2006.01)
*G06Q 10/067* (2023.01)
*B64U 101/64* (2023.01)

(52) U.S. Cl.
CPC ......... *G06Q 10/067* (2013.01); *G06Q 10/083* (2013.01); *B64U 2101/64* (2023.01)

(58) Field of Classification Search
CPC ...... G05D 1/101; G05D 1/104; G06Q 10/067; G06Q 10/083; B64C 39/024; B64D 9/00
See application file for complete search history.

(56) References Cited

U.S. PATENT DOCUMENTS

| | | | |
|---|---|---|---|
| 9,567,081 | B1 * | 2/2017 | Beckman ................... B64C 1/22 |
| 10,380,667 | B2 | 8/2019 | Balasubramanian et al. |
| 10,890,921 | B2 | 1/2021 | Gillett |
| 2016/0101874 | A1 * | 4/2016 | McKinnon ............. A47G 29/14 |
| | | | 244/114 R |
| 2017/0091711 | A1 | 3/2017 | Akselrod et al. |
| 2019/0168392 | A1 * | 6/2019 | Väin ....................... G06Q 10/00 |
| 2020/0167722 | A1 | 5/2020 | Goldberg |
| 2021/0280074 | A1 * | 9/2021 | Ali ......................... H04L 9/3236 |
| 2023/0016733 | A1 * | 1/2023 | Diankov ................ B65G 57/02 |
| 2024/0002162 | A1 * | 1/2024 | Moore, II .............. B25J 9/0084 |

OTHER PUBLICATIONS

Anonymous, "Method and System for Dynamic Rerouting of Delivery Drone Based on Dynamic Customer Delivery Location," IP.com, IP.com No. IPCOM000243701D, Oct. 13, 2015, pp. 1-3.

* cited by examiner

STABILITY IN ARRANGEMENT OF PACKAGES DELIVERED BY DRONES

TECHNICAL FIELD

The present disclosure relates generally to delivery drones, and more particularly to ensuring the stability in the arrangement of a pile of packages that were delivered at the same destination by multiple drones.

BACKGROUND

A delivery drone is an unmanned aerial vehicle (UAV) used to transport packages, medical supplies, food, or other goods. Delivery drones are typically autonomous. Recently, in November of 2020, the U.S. Federal Aviation Administration (FAA) proposed airworthiness criteria for type certification of delivery drones with an intent to initialize commercial operations.

SUMMARY

In one embodiment of the present disclosure, a computer-implemented method for ensuring stability in an arrangement of a pile of packages delivered by drones comprises receiving package information from the drones delivering a plurality of packages to a destination within a duration of time. The method further comprises performing simulations of stacking the plurality of packages using different approaches based on the received package information. The method additionally comprises identifying an arrangement of stacking the plurality of packages in a particular order and in a particular manner by the drones within the duration of time that maximizes a stability in a resulting arrangement of a pile of the plurality of packages based on the simulations. Furthermore, the method comprises instructing the drones to deliver the plurality of packages to the destination within the duration of time in the particular order and in the particular manner based on the identified arrangement of stacking the plurality of packages.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
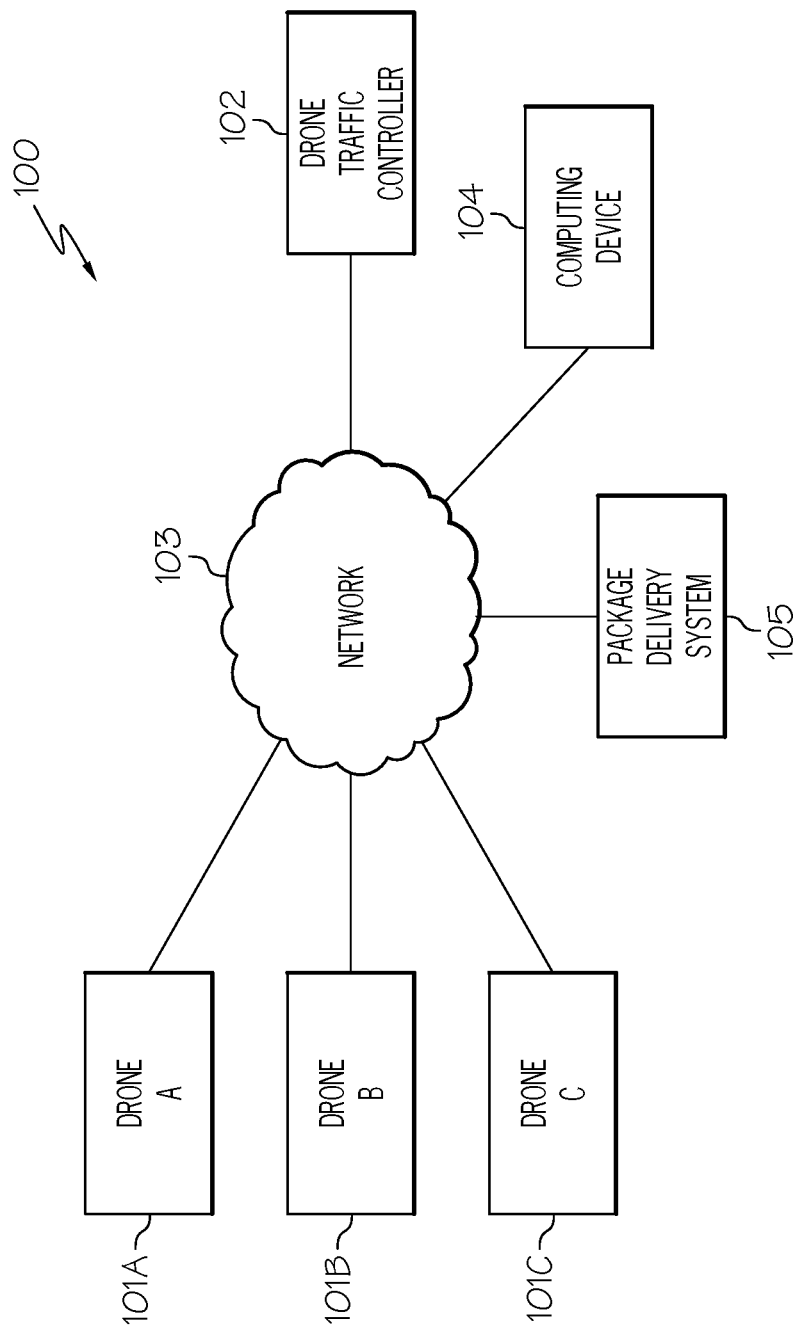
FIG. 1 illustrates a communication system for practicing the principles of the present disclosure in accordance with an embodiment of the present disclosure.

As stated above, a delivery drone is an unmanned aerial vehicle (UAV) used to transport packages, medical supplies, food, or other goods. Delivery drones are typically autonomous. Recently, in November of 2020, the U.S. Federal Aviation Administration (FAA) proposed airworthiness criteria for type certification of delivery drones with an intent to initialize commercial operations.

Drones can be used to transport medicinal products, such as blood products, vaccines, pharmaceuticals, and medical samples. For example, drones may be used to transport medicinal products into remote or otherwise inaccessible regions. Furthermore, drones have been proposed as a solution for rapidly delivering prepared foods, such as pizzas, tacos, and frozen beverages. Additionally, drones are starting to be used to deliver packages.

As the use of drones for delivering packages to consumers from online stores, brick & mortar stores, restaurants, etc. becomes more ubiquitous, the issue of having packages stacked in an unstable manner may become an issue.

For example, if multiple drones are piling the packages at a particular destination (e.g., porch of a customer), such drones should ensure the stability of the piled or stacked packages. If the packages are not stacked in a stable manner, then the piled packages may collapse resulting in damage to the contents (e.g., products) of such packages. Furthermore, when the piled packages collapse, such collapsed packages run the risk of being mishandled by the customer.

Unfortunately, there is not currently a means for ensuring that such packages delivered by the drones are piled in a manner that prevents the collapse of such piled packages.

The embodiments of the present disclosure provide a means for enabling drones to deliver and stack/pile packages in a stable manner whereby the collapse of such piled packages is prevented. In one embodiment, each drone to deliver one or more packages to the same destination analyzes the dimensions, shape, weight, and center of gravity position of each package to be delivered. Such package information is then used to perform simulations of stacking the packages at the same destination using different approaches within a duration of time (e.g., within a user-designated number of hours). Based on such simulations, an optimal arrangement of stacking the packages at the destination in a particular order and in a particular manner (e.g., placing package #6 on the top center of package #4) by the drones within the duration of time that maximizes a stability in the resulting arrangement of the pile of packages is identified. The drones that are delivering packages to such a destination are then instructed to deliver their packages in such a particular order and in such a particular manner within a duration of time based on such a determined optimal arrangement of stacking the packages. A further discussion regarding these and other features is provided below.

In some embodiments of the present disclosure, the present disclosure comprises a computer-implemented method, system and computer program product for ensuring stability in the arrangement of a pile of packages delivered by drones. In one embodiment of the present disclosure, package information concerning packages to be delivered by multiple drones at the same destination within a duration of time (e.g., five hours) is received from such drones. Package information may include the dimensions, shape, weight, and center of gravity position for each package to be delivered at the destination. Upon receipt of such information, simulations are performed of stacking the packages using different approaches based on the received package information. In one embodiment, various simulations are performed in which each simulation stacks the packages to be delivered at the destination in a different order and in a different manner (e.g., package #2 stacked on the left-hand corner of package #1, package #2 stacked on the right-hand corner of package #1, etc.). Based on simulating the various ways of stacking the packages to be delivered at the destination, the optimal arrangement of stacking the packages at the destination in a particular order and in a particular manner by the drones within the duration of time that maximizes the stability in the resulting arrangement of the pile of packages (i.e., prevents the collapse of such piled packages) is identified. In one embodiment, such an optimal arrangement involves delivering such packages in a particular order (e.g., deliver box #3 after delivering box #2) and in particular manner (e.g., place box #6 on the right corner of box #4 and on the left corner of box #2) that maximizes the stability of the pile of packages (i.e., prevents the collapse of such piled packages). The drones scheduled to deliver the packages to such a destination are then instructed to deliver such packages to the destination in a particular order and in a particular manner based on the identified optimal arrangement of stacking the packages. In this manner, drones are able to deliver and stack/pile packages in a stable manner whereby the collapse of such piled packages is prevented.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes drones 101A-101C (identified as "Drone A," "Drone B," and "Drone C," respectively, in FIG. 1) connected to a drone traffic controller 102 via a network 103.

Drones 101A-101C may collectively or individually be referred to as drones 101 or drone 101, respectively. A "drone 101," as used herein, refers an unmanned aerial vehicle used to transport items, such as packages, where such packages may contain medical supplies, products, food or other goods. In one embodiment, such drones 101 travel safely and efficiently among other drones 101, helicopters, airplanes, etc. via drone traffic controller 102 (e.g., unmanned aircraft system traffic management (UTM)).

In one embodiment, drone traffic controller 102 is configured to regulate the travel of drones 101 to ensure the safety in the airspace. For example, alerts are triggered by drone traffic controller 102 for potential collisions and airspace can be blocked on demand or when necessary in order to ensure safety in the airspace. An example of such a drone traffic controller 102 is the UAS traffic management system by Aloft®. Another example of such a drone traffic controller 102 is the UTM system being developed by the Federal Aviation Administration and other U.S. federal agencies, such as the National Aeronautics and Space Administration (NASA).

In one embodiment, drone traffic controller 102 incorporates localized weather predictions into flight planning provided by drones 101 to improve the flight path of drones 101.

In one embodiment, drones 101 use cell phone networks to enhance drone traffic communications and rely on cameras, radar and other ways of "seeing" to ensure drones 101 can maneuver around buildings and land when needed—all while communicating with other drones 101 and drone traffic controller 102.

In one embodiment, drones 101 are configured to deliver one or more packages to a destination (e.g., customer's residence, location in a warehouse), including delivering packages to the same destination. In one embodiment, such drones 101 may be delivering packages from different providers to the same destination. In one embodiment, drones 101 are configured to analyze the dimensions, shape, weight, and center of gravity position of each package to be delivered. Such package information is then used to perform simulations of stacking the packages at the same destination using different approaches (e.g., placing package #2 on the left-hand corner of package #1 versus placing package #2 on the right-hand corner of package #1, etc.) within a duration of time (e.g., within a user-designated number of hours) as discussed further below.

A description of a perspective view of drone 101 is provided below in connection with FIG. 2. Furthermore, a description of a hardware configuration of drone 101 is provided below in connection with FIG. 3.

Furthermore, as illustrated in FIG. 1, system 100 includes a computing device 104 connected to network 103, such as a computing device 104 of a user whose packages are to be delivered at a destination (e.g., user's house). As will be discussed in greater detail below, the user of computing device 104 may be informed of the delivery of a package, including being provided a captured image of the arrangement of the packages (i.e., the arrangement of the pile of packages) at a destination (e.g., user's house) upon delivery of the package at the destination. In one embodiment, as will be discussed in greater detail below, the user may receive instructions for picking up which packages and in what order in order to prevent the collapse of the pile of packages. In one embodiment, such instructions may be augmented reality based guidance in which computer generated information enables the simulation of picking up the packages in a particular order and in a particular manner in order to prevent the collapse of the pile of packages. It is noted that both computing device 104 and the user of computing device 104 may be identified with element number 104.

Computing device 104 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 104 and package delivery system 105 (discussed below).

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, a cellular network and various combinations thereof, etc. Other networks, whose descriptions are omitted here for brevity, may also be used in conjunction with system 100 of FIG. 1 without departing from the scope of the present disclosure.

In one embodiment, network 103 corresponds to a collaboration network based on security keys provided at a customer location (location of the customer who receives the packages delivered at the destination).

Furthermore, as illustrated in FIG. 1, system 100 includes a package delivery system 105 connected to network 103. In one embodiment, package delivery system 105 is configured to enable drones 101 to deliver and stack/pile packages in a stable manner whereby the collapse of such piled packages is prevented. As discussed above, drones 101 are configured to analyze the dimensions, shape, weight, and center of gravity position of each package to be delivered. Such package information is then provided to package delivery system 105 which uses such information to perform simulations of stacking the packages at the same destination using different approaches (e.g., stacking package #2 on the left-hand corner of package #1, stacking package #2 on the right-hand corner of package #1, etc.) within a duration of time (e.g., within a user-designated number of hours). Based on such simulations, an optimal arrangement of stacking the packages at the destination in a particular order and in particular manner (e.g., placing package #6 on the top center of package #4) by drones 101 within the duration of time that maximizes the stability in the resulting arrangement of the pile of packages is identified. Upon identifying such an optimal arrangement, package delivery system 105 instructs drones 101 to deliver packages to the destination (e.g., residence address) in a particular order (e.g., drone 101A delivers package A first followed by drone 101B delivering package C) and in a particular manner (e.g., package E is to be placed on the top left-hand corner of package C) to enable the packages to be delivered in a manner that corresponds to the optimal arrangement of the packages. Furthermore, package delivery system 105 is configured to provide drones 101 an image of the arrangement of the pile of packages to be present at the time of delivering the package(s) at the destination.

In one embodiment, drone 101 receives instructions from package delivery system 105 to deliver a package(s) during a particular window of time in a particular manner (e.g., stack package #5 on the top right-hand corner of package #3, orient package #4 so that the label is facing up, etc.). Furthermore, in one embodiment, drone 101 receives from package delivery system 105 an image of the arrangement of the pile of packages to be present at the time of delivering the package(s) at the destination. In one embodiment, drone 101 captures the image of the current arrangement of the pile of packages at the destination prior to delivering the package(s) at the destination. In one embodiment, the captured image is transmitted to package delivery system 105.

In one embodiment, package delivery system 105, or alternatively, drone 101 determines if the current arrangement of the pile of packages differs from the arrangement of the pile of packages to be present at the time of delivering the package(s) at the destination. If there is a difference, then, in one embodiment, package delivery system 105 instructs drone 101, or alternatively, drone 101 automatically rearranges the pile of packages to correspond to the arrangement of the pile of packages to be present at the time of delivering the package(s) at the destination. In one embodiment, such rearrangement may include removing obstacles, keeping an uneven space empty, utilizing smaller packages to fill-in gaps between packages, utilizing large and bulky packages on the lower or bottom level of the stack of packages, changing an orientation of a package, etc.

In one embodiment, drones 101 are configured to capture images of the arrangement of the pile of packages at the destination after delivering the package(s) at the destination. Such information may be provided to package delivery system 105, which may later be transferred to the computing device 104 of the customer, such as the customer who received such packages at the destination, as discussed below.

These and other features will be discussed in further detail below.

Furthermore, a description of the software components of package delivery system 105 is provided below in connection with FIG. 4 and a description of the hardware configuration of package delivery system 105 is provided further below in connection with FIG. 5.

System 100 is not to be limited in scope to any one particular network architecture. System 100 may include any number of drones 101, drone traffic controllers 102, networks 103, computing devices 104 and package delivery systems 105.

A discussion regarding a perspective view of drone 101 and the hardware configuration of drone 101 is provided below in connection with FIGS. 2-3.

Figure 2:
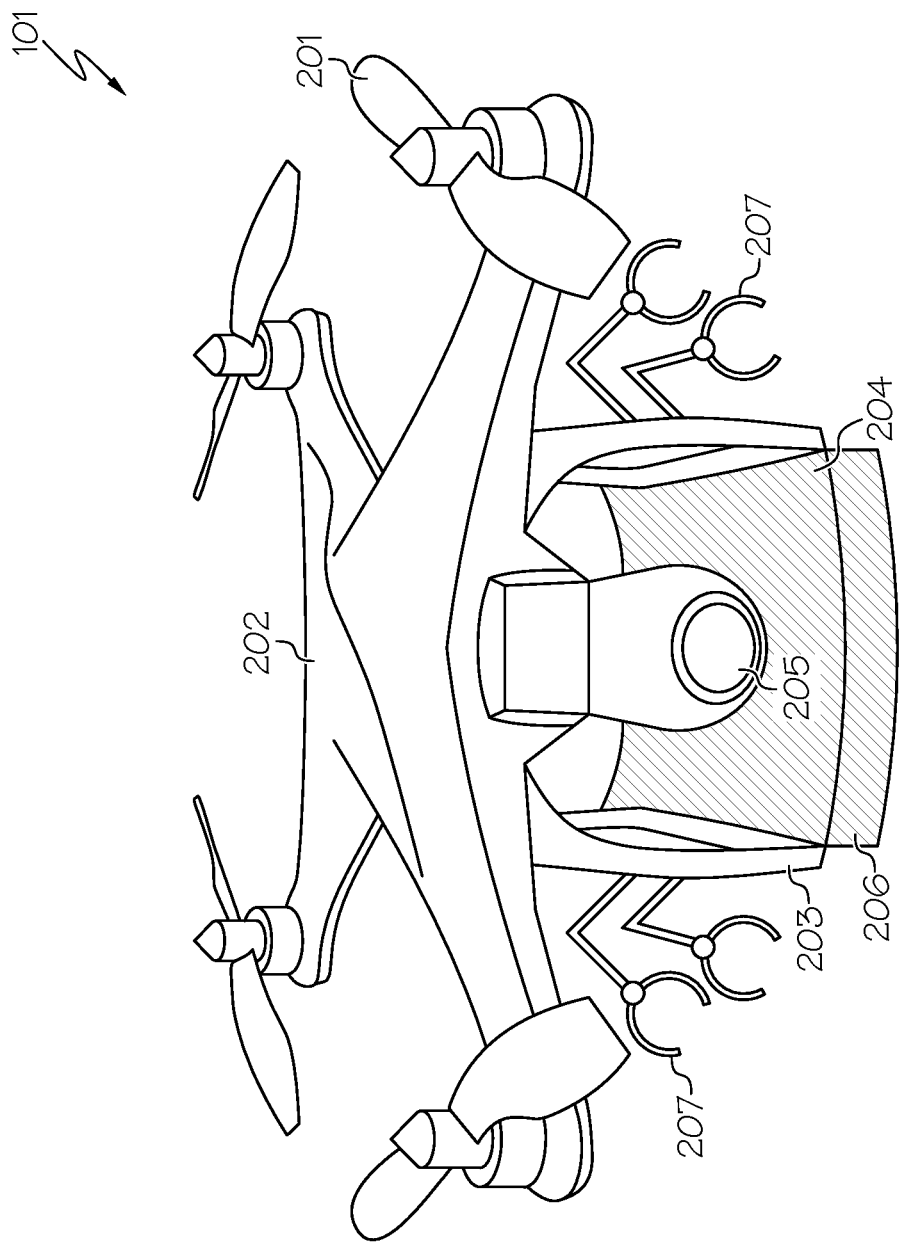
FIG. 2 illustrates a perspective view of a drone in accordance with an embodiment of the present disclosure.

FIG. 2 illustrates a perspective view of drone 101 in accordance with an embodiment of the present disclosure.

Referring to FIG. 2, in conjunction with FIG. 1, drone 101 may be a commercially available UAV platform (e.g., Amazon Prime® Air drones, DJI® Inspire 1 Pro, Yuneec® Tornado H920, etc.) modified to implement the features discussed herein. In one embodiment, drone 101 includes rotors 201 attached to a body 202. A lower frame 203 is located on a bottom portion of body 202 and is utilized to support a cargo holder 204 for holding packages to be delivered at a destination.

In one embodiment, lower frame 203 is further configured to support landing drone 101 to rest on a flat surface and absorb impact during landing. Drone 101 further includes sensors 205, such as a camera, which are used to take still photographs, video, and the like. For example, sensors 205 are configured to capture images of the current arrangement of the pile of packages at a destination prior to delivering a package(s) at the destination and after delivering a package(s) at the destination. Examples of sensors 205 include, but not limited to, a Zenmuse® zooming camera, an iXM series of cameras, a 4-Band camera, a P3 Payload camera, etc.

In one embodiment, cargo holder 204 utilizes a scale 206 integrated with cargo holder 204 that is used to determine the weight of a package(s) placed in cargo holder 204. For example, scale 206 may correspond to a portable mini digital scale (e.g., Superior I-2000 portable digital scale, Wewdigi® digital scale, TOP2KG, etc.). In one embodiment, the weight is obtained for each package as each package is placed on cargo holder 204. In situations in which a package is already placed on cargo holder 204, when a new package is placed on cargo holder 204, the weight of the pre-existing packages on cargo holder 204 is then subtracted from the total weight of the packages on cargo holder 204 in order to obtain the weight of the newly added package on cargo holder 204. In one embodiment, the weight obtained from scale 206 for each package placed on cargo holder 204 may be transmitted to package delivery system 105.

In one embodiment, drone 101 includes various electronic components inside body 202 and/or the camera 205, such as, without limitation, a processor, a data store, memory, a wireless interface, and the like. Also, drone 101 can include additional hardware, such as robotic arms or pickup tongs 207 or the like that allow the drone 101 to attach/detach/rearrange/move packages.

Figure 3:
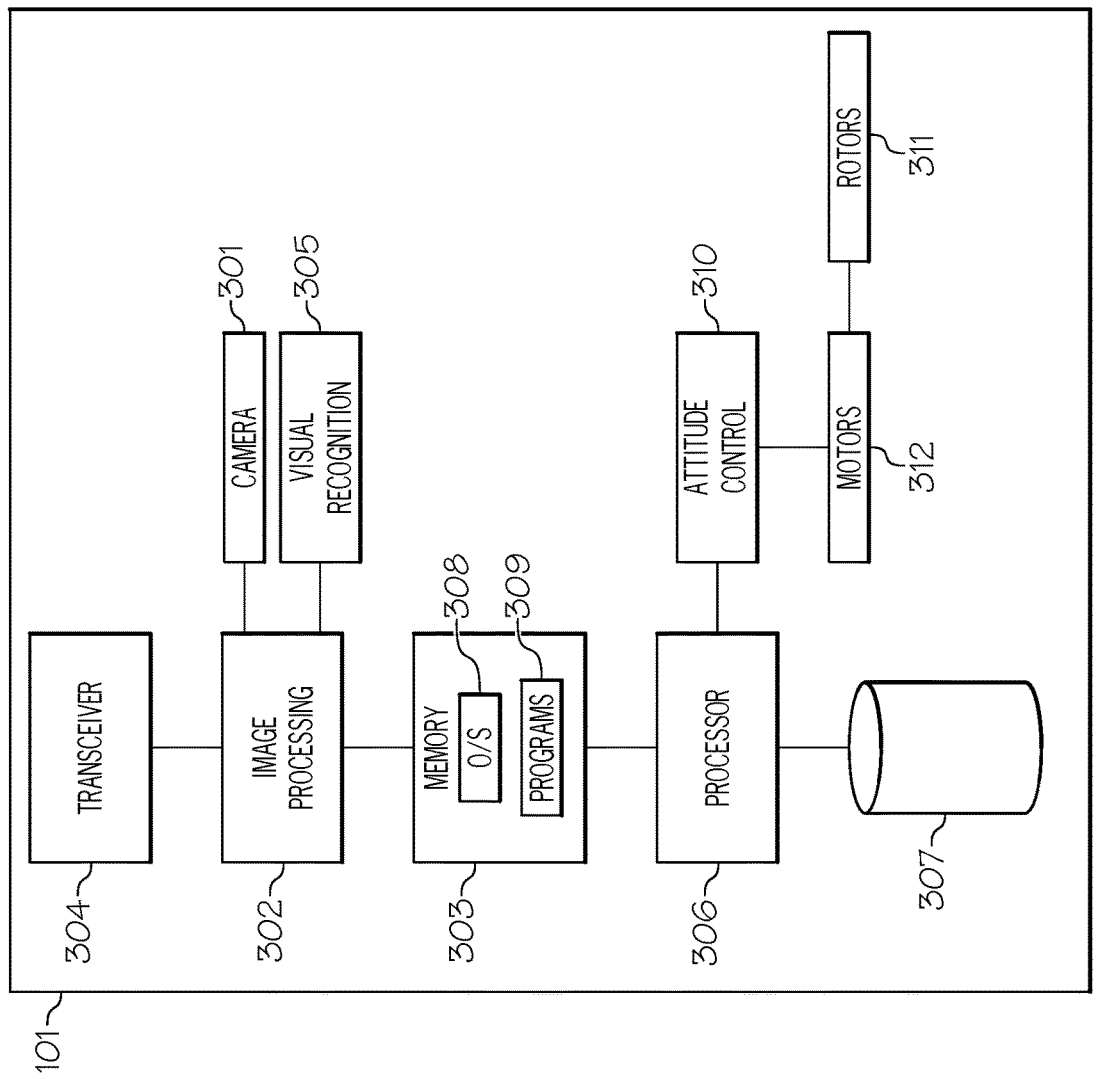
FIG. 3 illustrates the hardware configuration of a drone in accordance with an embodiment of the present disclosure.

Referring now to FIG. 3, FIG. 3 illustrates the hardware configuration of drone 101 in accordance with an embodiment of the present disclosure.

Referring to FIG. 3, in conjunction with FIGS. 1-2, drone 101 includes an onboard camera 301 (see element 205), such as for capturing an image of a package(s) placed in cargo holder 204 as well as for capturing an image of the pile of packages at the destination prior to and after delivering a package(s) at the destination. For example, camera 301 may be connected to an image processing system 302. Image processing system 302 may compress the incoming stream of images for broadcast or retransmission. Image processing system 302 may store a processed image stream based on captured images in onboard memory 303, or transmit the image stream to a wireless device or package delivery system 105 via a wireless transceiver 304.

In one embodiment, upon drones 101 receiving instructions from package delivery system 105 as to the order and manner in delivering packages to the destination, such drones 101 communicate amongst each other via wireless transceiver 304. Such communication may involve the order of delivering packages (e.g., drone 101A delivers package A followed by drone 101C delivering package B followed by drone 101B delivering packages C and E), the success or failure in delivering such packages as well as visual images (discussed further below) of the pile of packages that resides at the destination after delivering the package.

In one embodiment, drones 101 communicate amongst each other using multi-channel collaboration with package delivery system 105 to ensure that the sequencing of the delivery of packages as well as piling information, including both captured images of the piled packages or instructions, can be shared with drones 101 that are responsible for delivering the packages at the destination.

Drone 101 may further include a visual recognition system 305 connected to image processing system 302. Visual recognition system 305 may include one or more processors configured to analyze captured images, such as the captured image of the package in cargo holder 204, and identify the dimensions and shape of the package in cargo holder 204 from the analyzed image. In one embodiment, visual recognition system 305 utilizes a function (e.g., cv2.findContours( ) function of OpenCV) to identify the dimensions and shape of the package in cargo holder 204 from the captured image of the package in cargo holder 204. In one embodiment, visual recognition system 305 utilizes various software tools to determine the dimensions and shape of the package in cargo holder 204 from the analyzed image, including, but not limited to, ImageJ, JMicro Vision, IC Measure, Digimizer, CMEIAS Image Tool, Image-Pro Plus 7, etc.

Furthermore, drone 101 includes a processor 306 connected to memory 303 for executing software instructions. Processor 306 may be any custom made or commercially available processor, a central processing unit, an auxiliary processor among several processors, a semiconductor-based microprocessor (in the form of a microchip or chip set) or generally any device for executing software instructions.

Additionally, drone 101 includes a data store 307 connected to processor 306 to store data. Data store 307 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, data store 307 may incorporate electronic, magnetic, optical, and/or other types of storage media.

Memory 303 may include any volatile memory elements (e.g., random access memory (RAM, such as DRAM, SRAM, SDRAM, etc.)), nonvolatile memory elements (e.g., ROM, hard drive, etc.), and combinations thereof. Moreover, memory 303 may incorporate electronic, magnetic, optical, and/or other types of storage media. It is noted that memory 303 may have a distributed architecture, where various components are situated remotely from one another but can be accessed by processor 306. The software in memory 303 may include one or more software programs, each of which includes an ordered listing of executable instructions for implementing logical functions. In the example of FIG. 3, the software in memory 303 includes a suitable operating system (O/S) 308 and programs 309. Operating system 308 essentially controls the execution of other computer programs and provides scheduling, input-output control, file and data management, memory management, and communication control and related services. Program 309 may include various applications, add-ons, etc. configured to assist package delivery system 105 in ensuring that packages are placed at the destination in a manner that prevents the collapse of such piled packages as discussed herein, including performing various aspects of the methods described herein.

In one embodiment, programs 309 include a program for calculating the center of gravity position of each package placed in cargo holder 204. In one embodiment, the center of gravity position of a package is determined by taking the sum of the average value of the weight/volume times the distance times the volume segment divided by the weight. As previously discussed, the weight is obtained from scale 206. In one embodiment, the volume is obtained from the dimensions (length, width and height) of the package, which are obtained from visual recognition system 305.

In one embodiment, the dimensions, shape, weight, and center of gravity position of a package (collectively referred to as the "package information") is acquired by drone 101 from analyzing the package as discussed above. Such package information may be transmitted to package delivery system 105, such as via wireless transceiver 304.

Additionally, drone 101 further includes an attitude control system 310 connected to processor 306. In one embodiment, attitude control system 310 executes any necessary changes in heading, position, or velocity by varying the rotational speed of one or more rotors 311 of drone 101. Such changes may correspond to enabling drone 101 to place packages at the destination in a certain manner (e.g., place package #5 on the left-hand corner of package #2). Furthermore, such changes may enable drone 101 to rearrange the pile of packages to correspond to a particular arrangement as determined by package delivery system 105. In such an embodiment, drone 101 includes robotic arms 207 for rearranging the pile of packages to correspond to a particular arrangement as determined by package delivery system 105.

In one embodiment, the rotor speeds of each rotor 311 may be directly controlled by one or more motors 312 connected to attitude control system 310. For example, a multi-rotor drone 101 may include four, six, eight, or any other appropriate number of rotors 311. Adjusting the speed of one or more rotors 311 may control the height of drone 101, rotate drone 101 along multiple rotational axes or degrees of freedom, or propel drone 101 in any desired direction at variable speeds.

These and other features will be discussed in greater detail further below.

Figure 4:
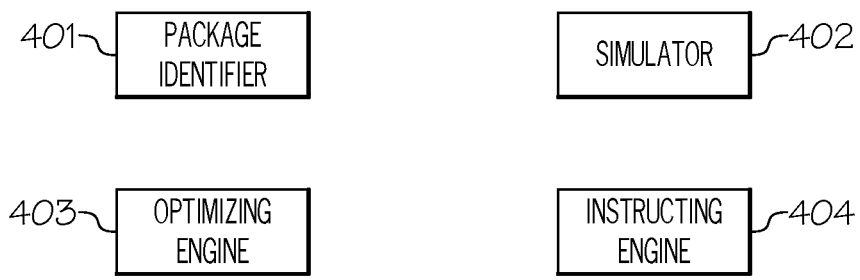
FIG. 4 is a diagram of the software components of the package delivery system used to ensure the stability in the arrangement of a pile of packages delivered by drones in accordance with an embodiment of the present disclosure.

Referring now to FIG. 4, FIG. 4 is a diagram of the software components of package delivery system 105 used to ensure the stability in the arrangement of a pile of packages delivered by drones 101 in accordance with an embodiment of the present disclosure.

As shown in FIG. 4, package delivery system 105 includes a package identifier 401 configured to identify the package information for each package to be delivered by a drone 101 at a particular destination.

As previously discussed, drones 101 are configured to analyze each package to be delivered to a destination (e.g., home residence) to obtain package information, including the dimensions, shape, weight, and center of gravity position of the package. Such package information is transmitted to package identifier 401 of package delivery system 105. In one embodiment, such package information further includes the destination (e.g., location in warehouse, home residence) for the package to be delivered. In one embodiment, such a destination is associated with an identifier, which is used by package identifier 401 to determine which packages are to be delivered to which destination, including an expected day (and possibly time) of delivery. In one embodiment, such an identifier is provided to drone 101 by the service provider, who is responsible for sending the package to a customer location. In one embodiment, such delivery information is stored in a data structure (e.g., table). As a result, package identifier 401 is able to determine which packages are to be delivered at the same destination, including on the same day, by searching through such a data structure. In one embodiment, such a data structure is stored in the storage device of package delivery system 105.

In one embodiment, upon receipt of such information, package identifier 401 associates such package information to each package to be delivered to a particular destination within a certain period of time (e.g., same day). As a result, package identifier 401 determines the set of packages (e.g., five packages) to be delivered to the same destination (e.g., particular home residence) within a period of time (e.g., same day). In one embodiment, package identifier 401 stores such information, such as the package information for each package to be delivered at the same destination within a period of time (e.g., same day), in a data structure (e.g., table). In one embodiment, such a data structure is stored in a storage device of package delivery system 105.

Package delivery system 105 further includes a simulator 402 configured to perform different simulations of stacking the packages to be delivered at the same particular destination (e.g., particular home residence) by drones 101 within a duration of time, which may be user-designated, based on package information received from drones 101. Such simulations may involve various approaches to stacking the packages. For example, simulator 402 may perform simulations of piling the packages to be delivered at the same destination in a different order (e.g., package #4 is placed on the pile of packages prior to stacking package #5 on the pile of packages versus placing package #5 on the pile of packages prior to stacking package #4 on the pile of packages) and in a different manner (e.g., stacking package #2 on the left-hand corner of package #1 versus stacking package #2 on the right-hand corner of package #1, etc.). In one embodiment, simulator 402 utilizes various software tools, including, but not limited to, Simio®, FlexSim®, aPrirori®, SIMUL8®, Vensim®, ExtendSim®, etc.

Based on simulating the various approaches of stacking the packages to be delivered at the same destination, optimizing engine 403 (discussed further below) of package delivery system 105 determines the optimal arrangement of stacking the packages at the destination in a particular order and in particular manner (e.g., place package #6 on the top center of package #4) by drones 101 within a duration of time (e.g., within five hours) that maximizes the stability in the pile of packages (i.e., prevents the collapse of such piled packages). In one embodiment, the stability of the pile of packages is determined using progressive collapse analysis. In one embodiment, progressive collapse analysis is performed by simulator 402 using various software tools, including, but not limited to, Extreme Loading®. In one embodiment, such analysis involves basing a "collapse" on lateral displacement analysis, which involves engineering judgement-based predefined limits. For example, there are various predefined limits as to how far a first package placed on a second package can extend beyond the border of the second package without collapsing (falling down) based on the width of such first and second packages. In one embodiment, the particular way of stacking the packages that results in the highest score for stability (i.e., preventing the collapse of such piled packages within the predefined limits) corresponds to the optimal arrangement for the pile of packages.

In one embodiment, simulator 402 utilizes the finite element method to enforce equilibrium on each point of a pile of packages, where the dimensions and shapes of the simulated pile of packages correspond to the dimensions and shapes as provided in the package information for such packages. Particles of each of the piled packages are free to separate from one another, which is advantageous in the simulation of collapsing the piled packages. In one embodiment, the finite element method is performed using a three-dimensional finite particle model using Matlab®.

In one embodiment, in connection with simulating the various approaches of stacking the packages to be delivered at the same destination, simulator 402 determines how close the center of gravity position for each package is to the center of each package(s) upon which it resides (except for those residing on the ground). As previously discussed, the center of gravity position of a package is the point at which the weight of the package is concentrated. This is the center point from which the weight is evenly dispersed on all the sides. As a result, the center of gravity position determines exactly when the package will reach its tipping point and fall over.

In one embodiment, in each of the simulations performed by simulator 402, a line is drawn straight down from the center of gravity position of the package. The package is tilted while keeping the line pointed vertically down from the center of gravity position at all times. The line will allow simulator 402 to determine the moment the center of gravity passes past the base (bottom-center) of the package. This is the point at which the package has reached its tipping point and will fall over.

In one embodiment, optimizing engine 403 assigns a score to each simulated arrangement based on the stability of each arrangement. That is, optimizing engine 403 assigns a score to each simulated arrangement based on how far the center of gravity position for each package in the piled set of packages is to passing the base (bottom-center) of the package. The further away that the center of gravity position is from passing the base of the package, the less likely that package will fall over. The greater the number of packages where it is not likely for its center of gravity to pass the base of the package, the higher the score thereby indicating a greater stability in such an arrangement.

In one embodiment, the arrangement that has been assigned the highest score is selected as corresponding to the optimal arrangement (i.e., the arrangement of the pile of packages to occur when the packages are delivered at the destination). In order to implement such an arrangement of the pile of packages, such packages need to be delivered in a particular order (e.g., package #2 is to be delivered prior to package #3) and in particular manner (e.g., package #5 placed on the top middle of package #3). Such an order and manner is determined based on the simulation of the identified optimal arrangement. For example, the simulation of the optimal arrangement that was performed by simulator 402 may include the order in which the packages are delivered, including the manner in stacking such packages. For instance, the simulation may indicate that the largest package should be first delivered and form the base of the pile of packages. The simulation may further indicate the next package to be delivered and in what manner (e.g., placed on the center-right of the first package) it should be placed on the previously placed package and so forth. In such a manner, the optimal arrangement of the pile of packages may be perfected.

Package delivery system 105 further includes an instructing engine 404 configured to instruct drones 101 that are to deliver packages to the same destination within the duration of time, which may be user-designated, to deliver such packages in a particular order and in particular manner based on the optimal arrangement of stacking the packages as identified by optimizing engine 403. As previously discussed, in order to implement such an arrangement of the pile of packages, such packages need to be delivered in a particular order and in particular manner (e.g., package #5 placed on the top middle of package #3). In one embodiment, instructing engine 404 instructs drones 101 to deliver packages to the same destination within a duration of time in such a particular order and in such a particular manner in order to implement such an arrangement.

In one embodiment, for each of the drones 101 (with the exception of the first drone 101 to deliver a package to the destination) that is being utilized to deliver the packages to the destination, instructing engine 404 provides an image of the arrangement of the pile of packages that should exist at the destination prior to delivering the package(s) at the destination. Such an image is based on the simulation of the optimal arrangement of the pile of packages, in which such a simulation indicates the arrangement of the packages as each drone 101 drops off its package(s).

In one embodiment, for each of the drones 101 (with the exception of the first drone 101 to deliver a package to the destination) that is being utilized to deliver the packages to the destination, drone 101 captures an image of the current arrangement of the pile of packages, such as via camera 301, at the destination prior to delivering the package(s) at the destination. In one embodiment, such images are provided from drone 101 that previously dropped off a package at the destination.

In one embodiment, instructing engine 404 determines if the current arrangement of the pile of packages differs from the arrangement of the packages to be present at the time of delivering the package(s) at the destination. If there is a difference, then, in one embodiment, instructing engine 404 instructs drone 101 to rearrange the pile of packages, such as via robotic arms 207, to correspond to the arrangement of the packages to be present at the time of delivering the package(s) at the destination. In one embodiment, such rearrangement may include removing obstacles, keeping an uneven space empty, utilizing smaller packages to fill-in gaps between packages, utilizing large and bulky packages on the lower or bottom level of the stack of packages, changing an orientation of a package, etc.

As discussed above, in one embodiment, drones 101 are configured to capture images of the arrangement of the pile of packages at the destination after delivering the package(s) at the destination. Such information may be provided to instructing engine 404, which may later be transferred to the computing device 104 of the customer, such as the customer who received such packages at the destination. Such information may be provided to computing device 104 via various electronic means, including e-mail or text message. In one embodiment, the information provided to computing device 104 may include instructions for picking up which packages and in what order in order to prevent the collapse of the pile of packages. In one embodiment, such instructions may be augmented reality based guidance in which computer generated information enables the simulation of picking up the packages in a particular order and in a particular manner in order to prevent the collapse of the pile of packages. In one embodiment, such augmented reality based guidance is based on the simulation corresponding to the identified optimal arrangement for stacking the packages at the destination in which the order and manner for picking up the packages is in the opposite sequence of the order and manner in stacking the packages.

A further description of these and other features is provided below in connection with the discussion of the method for ensuring the stability in the arrangement of a pile of packages delivered by drones 101 at a destination.

Prior to the discussion of the method for ensuring the stability in the arrangement of a pile of packages delivered by drones 101 at a destination (e.g., location in a warehouse, location at a residence), a description of the hardware configuration of package delivery system 105 (FIG. 1) is provided below in connection with FIG. 5.

Figure 5:
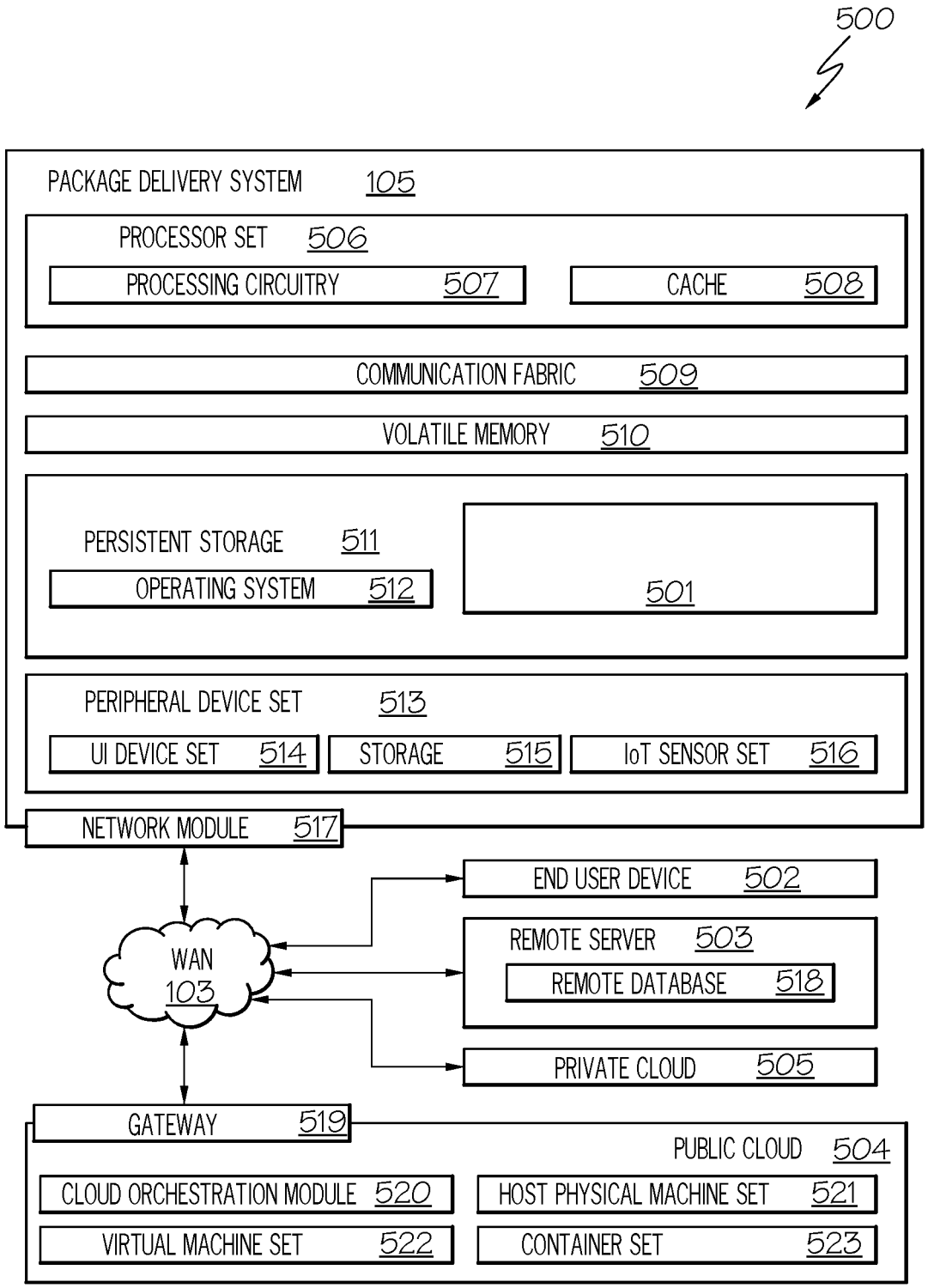
FIG. 5 illustrates an embodiment of the present disclosure of the hardware configuration of the package delivery system which is representative of a hardware environment for practicing the present disclosure.

Referring now to FIG. 5, in conjunction with FIG. 1, FIG. 5 illustrates an embodiment of the present disclosure of the hardware configuration of package delivery system 105 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code (stored in block 501) involved in performing the inventive methods, such as ensuring the stability in the arrangement of a pile of packages delivered by drones 101 at a destination. In addition to block 501, computing environment 500 includes, for example, package delivery system 105, network 103, such as a wide area network (WAN), end user device (EUD) 502, remote server 503, public cloud 504, and private cloud 505. In this embodiment, package delivery system 105 includes processor set 506 (including processing circuitry 507 and cache 508), communication fabric 509, volatile memory 510, persistent storage 511 (including operating system 512 and block 501, as identified above), peripheral device set 513 (including user interface (UI) device set 514, storage 515, and Internet of Things (IOT) sensor set 516), and network module 517. Remote server 503 includes remote database 518. Public cloud 504 includes gateway 519, cloud orchestration module 520, host physical machine set 521, virtual machine set 522, and container set 523.

Package delivery system 105 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 518. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically package delivery system 105, to keep the presentation as simple as possible. Package delivery system 105 may be located in a cloud, even though it is not shown in a cloud in FIG. 5. On the other hand, package delivery system 105 is not required to be in a cloud except to any extent as may be affirmatively indicated.

Processor set 506 includes one, or more, computer processors of any type now known or to be developed in the future. Processing circuitry 507 may be distributed over multiple packages, for example, multiple, coordinated integrated circuit chips. Processing circuitry 507 may implement multiple processor threads and/or multiple processor cores. Cache 508 is memory that is located in the processor chip package(s) and is typically used for data or code that should be available for rapid access by the threads or cores running on processor set 506. Cache memories are typically organized into multiple levels depending upon relative proximity to the processing circuitry. Alternatively, some, or all, of the cache for the processor set may be located "off chip." In some computing environments, processor set 506 may be designed for working with qubits and performing quantum computing.

Computer readable program instructions are typically loaded onto package delivery system 105 to cause a series of operational steps to be performed by processor set 506 of package delivery system 105 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 508 and the other storage media discussed below. The program instructions, and associated data, are accessed by processor set 506 to control and direct performance of the inventive methods. In computing environment 500, at least some of the instructions for performing the inventive methods may be stored in block 501 in persistent storage 511.

Communication fabric 509 is the signal conduction paths that allow the various components of package delivery system 105 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 510 is any type of volatile memory now known or to be developed in the future. Examples include dynamic type random access memory (RAM) or static type RAM. Typically, the volatile memory is characterized by random access, but this is not required unless affirmatively indicated. In package delivery system 105, the volatile memory 510 is located in a single package and is internal to package delivery system 105, but, alternatively or additionally, the volatile memory may be distributed over multiple packages and/or located externally with respect to package delivery system 105.

Persistent Storage 511 is any form of non-volatile storage for computers that is now known or to be developed in the future. The non-volatility of this storage means that the stored data is maintained regardless of whether power is being supplied to package delivery system 105 and/or directly to persistent storage 511. Persistent storage 511 may be a read only memory (ROM), but typically at least a portion of the persistent storage allows writing of data, deletion of data and re-writing of data. Some familiar forms of persistent storage include magnetic disks and solid state storage devices. Operating system 512 may take several forms, such as various known proprietary operating systems or open source Portable Operating System Interface type operating systems that employ a kernel. The code included in block 501 typically includes at least some of the computer code involved in performing the inventive methods.

Peripheral device set 513 includes the set of peripheral devices of package delivery system 105. Data communication connections between the peripheral devices and the other components of package delivery system 105 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 514 may include components such as a display screen, speaker, microphone, wearable devices (such as goggles and smart watches), keyboard, mouse, printer, touchpad, game controllers, and haptic devices. Storage 515 is external storage, such as an external hard drive, or insertable storage, such as an SD card. Storage 515 may be persistent and/or volatile. In some embodiments, storage 515 may take the form of a quantum computing storage device for storing data in the form of qubits. In embodiments where package delivery system 105 is required to have a large amount of storage (for example, where package delivery system 105 locally stores and manages a large database) then this storage may be provided by peripheral storage devices designed for storing very large amounts of data, such as a storage area network (SAN) that is shared by multiple, geographically distributed computers. IoT sensor set 516 is made up of sensors that can be used in Internet of Things applications. For example, one sensor may be a thermometer and another sensor may be a motion detector.

Network module 517 is the collection of computer software, hardware, and firmware that allows package delivery system 105 to communicate with other computers through WAN 103. Network module 517 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 517 are performed on the same physical hardware device. In other embodiments (for example, embodiments that utilize software-defined networking (SDN)), the control functions and the forwarding functions of network module 517 are performed on physically separate devices, such that the control functions manage several different network hardware devices. Computer readable program instructions for performing the inventive methods can typically be downloaded to package delivery system 105 from an external computer or external storage device through a network adapter card or network interface included in network module 517.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 502 is any computer system that is used and controlled by an end user (for example, a customer of an enterprise that operates package delivery system 105), and may take any of the forms discussed above in connection with package delivery system 105. EUD 502 typically receives helpful and useful data from the operations of package delivery system 105. For example, in a hypothetical case where package delivery system 105 is designed to provide a recommendation to an end user, this recommendation would typically be communicated from network module 517 of package delivery system 105 through WAN 103 to EUD 502. In this way, EUD 502 can display, or otherwise present, the recommendation to an end user. In some embodiments, EUD 502 may be a client device, such as thin client, heavy client, mainframe computer, desktop computer and so on.

Remote server 503 is any computer system that serves at least some data and/or functionality to package delivery system 105. Remote server 503 may be controlled and used by the same entity that operates package delivery system 105. Remote server 503 represents the machine(s) that collect and store helpful and useful data for use by other computers, such as package delivery system 105. For example, in a hypothetical case where package delivery system 105 is designed and programmed to provide a recommendation based on historical data, then this historical data may be provided to package delivery system 105 from remote database 518 of remote server 503.

Public cloud 504 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 504 is performed by the computer hardware and/or software of cloud orchestration module 520. The computing resources provided by public cloud 504 are typically implemented by virtual computing environments that run on various computers making up the computers of host physical machine set 521, which is the universe of physical computers in and/or available to public cloud 504. The virtual computing environments (VCEs) typically take the form of virtual machines from virtual machine set 522 and/or containers from container set 523. It is understood that these VCEs may be stored as images and may be transferred among and between the various physical machine hosts, either as images or after instantiation of the VCE. Cloud orchestration module 520 manages the transfer and storage of images, deploys new instantiations of VCEs and manages active instantiations of VCE deployments. Gateway 519 is the collection of computer software, hardware, and firmware that allows public cloud 504 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 505 is similar to public cloud 504, except that the computing resources are only available for use by a single enterprise. While private cloud 505 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 504 and private cloud 505 are both part of a larger hybrid cloud.

Block 501 further includes the software components discussed above in connection with FIGS. 2-4 to ensure the stability in the arrangement of a pile of packages delivered by drones 101 at a destination. In one embodiment, such components may be implemented in hardware. The functions discussed above performed by such components are not generic computer functions. As a result, package delivery system 105 is a particular machine that is the result of implementing specific, non-generic computer functions.

In one embodiment, the functionality of such software components of package delivery system 105, including the functionality for ensuring the stability in the arrangement of a pile of packages delivered by drones 101 at a destination may be embodied in an application specific integrated circuit.

As stated above, drones can be used to transport medicinal products, such as blood products, vaccines, pharmaceuticals, and medical samples. For example, drones may be used to transport medicinal products into remote or otherwise inaccessible regions. Furthermore, drones have been proposed as a solution for rapidly delivering prepared foods, such as pizzas, tacos, and frozen beverages. Additionally, drones are starting to be used to deliver packages. As the use of drones for delivering packages to consumers from online stores, brick & mortar stores, restaurants, etc. becomes more ubiquitous, the issue of having packages stacked in an unstable manner may become an issue. For example, if multiple drones are piling the packages at a particular destination (e.g., porch of a customer), such drones should ensure the stability of the piled or stacked packages. If the packages are not stacked in a stable manner, then the piled packages may collapse resulting in damage to the contents (e.g., products) of such packages. Furthermore, when the piled packages collapse, such collapsed packages run the risk of being mishandled by the customer. Unfortunately, there is not currently a means for ensuring that such packages delivered by the drones are piled in a manner that prevents the collapse of such piled packages.

Figure 6:
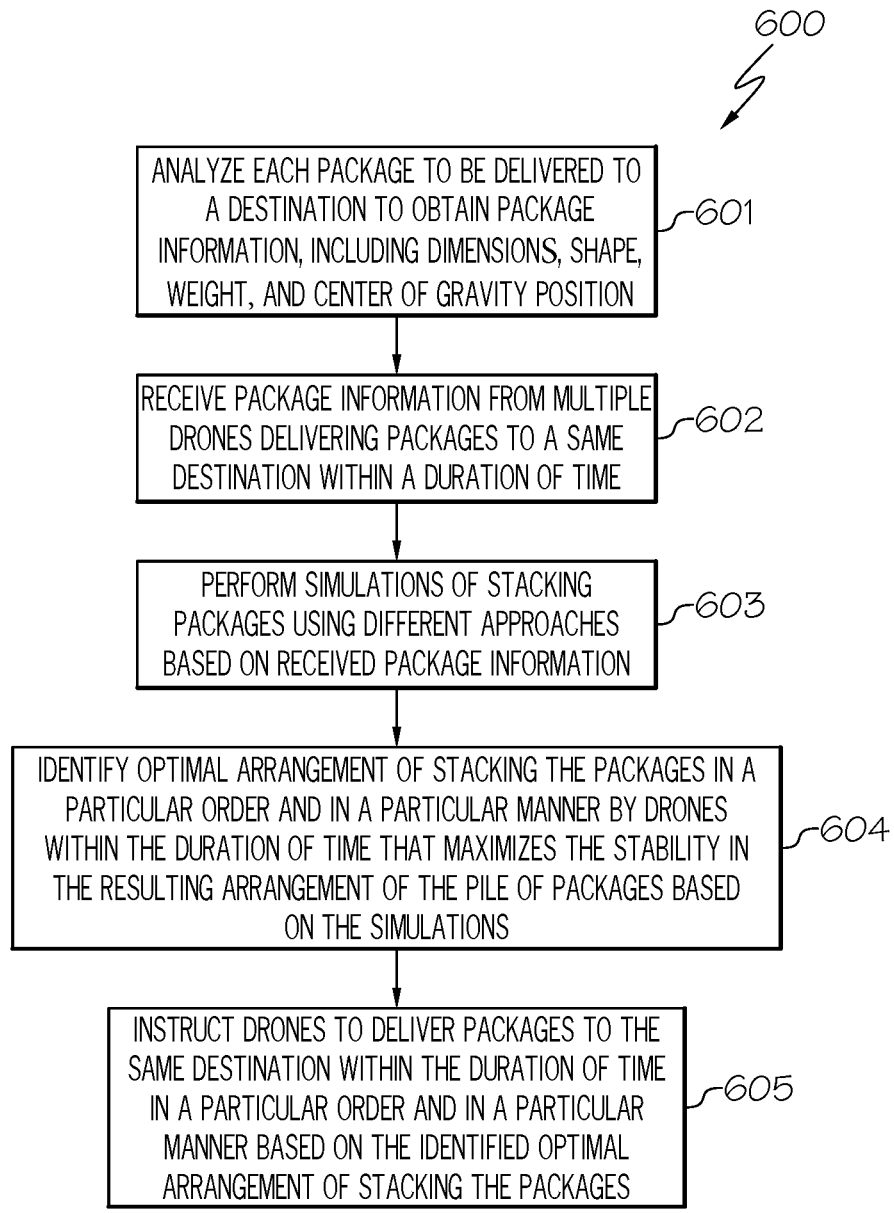
FIG. 6 is a flowchart of a method for ensuring the stability in the arrangement of a pile of packages delivered by drones at a destination in accordance with an embodiment of the present disclosure.
Figure 7:
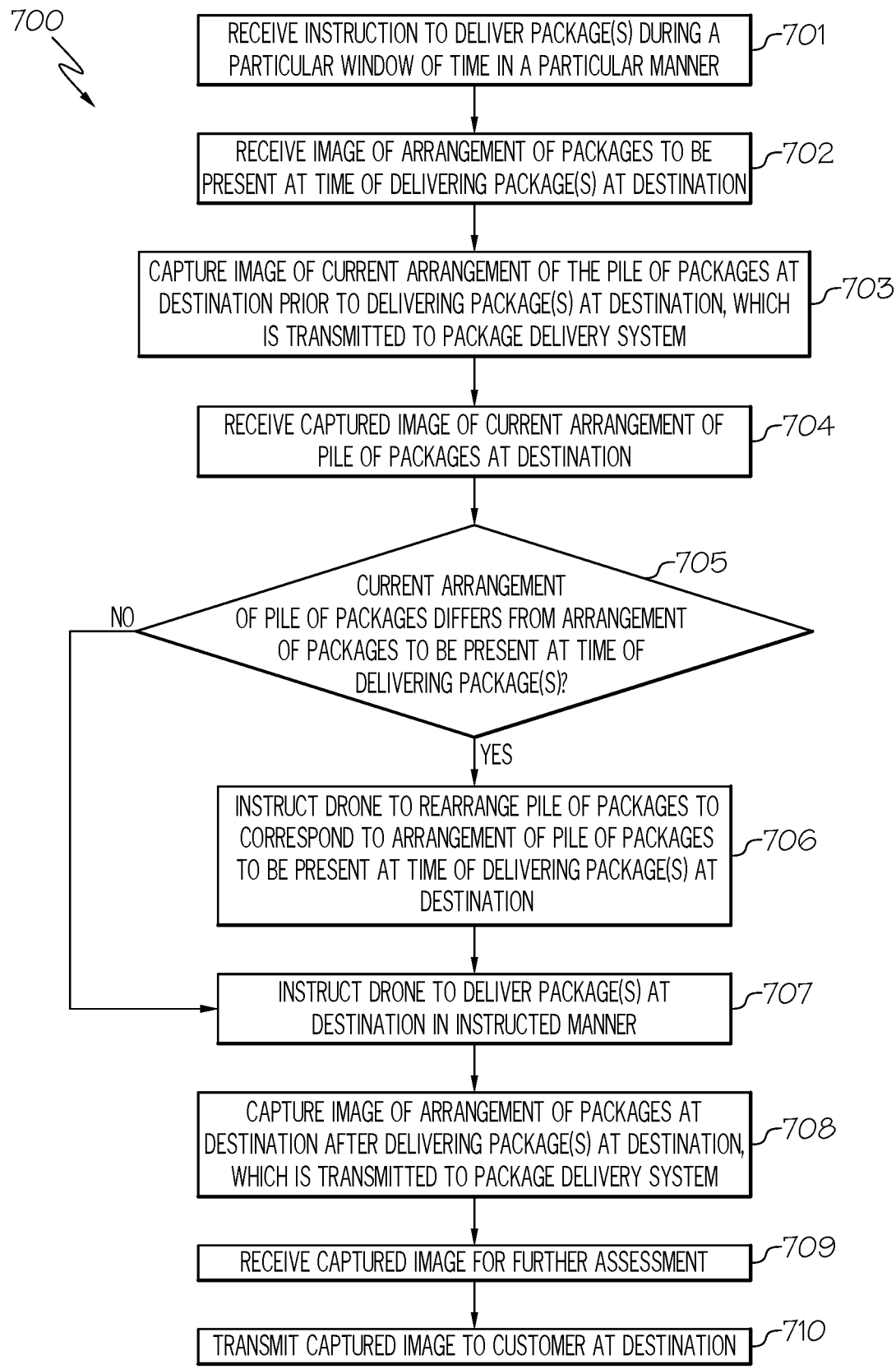
FIG. 7 is a flowchart of a method for having each drone ensure the stability in the arrangement of the piled packages at the destination in accordance with an embodiment of the present disclosure.

The embodiments of the present disclosure provide a means for enabling drones to deliver and stack/pile packages in a stable manner whereby the collapse of such piled packages is prevented as discussed below in connection with FIGS. 6-7. FIG. 6 is a flowchart of a method for ensuring the stability in the arrangement of a pile of packages delivered by drones (e.g., drones 101) at a destination. FIG. 7 is a flowchart of a method for having each drone ensure the stability in the arrangement of the piled packages at the destination.

As stated above, FIG. 6 is a flowchart of a method 600 for ensuring the stability in the arrangement of a pile of packages delivered by drones (e.g., drones 101) at a destination in accordance with an embodiment of the present disclosure.

Referring to FIG. 6, in conjunction with FIGS. 1-5, in operation 601, drones 101 analyze each package to be delivered to a destination to obtain package information, including the dimensions, shape, weight, and center of gravity position of the package.

As discussed above, drone 101 includes a visual recognition system 305, which analyzes the captured images, such as the captured image of the package in cargo holder 204, and identifies the dimensions and shape of the package in cargo holder 204 from the analyzed image. In one embodiment, visual recognition system 305 utilizes a function (e.g., cv2.findContours( ) function of OpenCV) to identify the dimensions and shape of the package in cargo holder 204 from the captured image of the package in cargo holder 204. In one embodiment, visual recognition system 305 utilizes various software tools to determine the dimensions and shape of the package in cargo holder 204 from the analyzed image, including, but not limited to, ImageJ, JMicroVision, IC Measure, Digimizer, CMEIAS Image Tool, Image-Pro Plus 7, etc.

Furthermore, in one embodiment, cargo holder 204 of drone 101 utilizes a scale 206 integrated with cargo holder 204 that is used to determine the weight of a package(s) placed in cargo holder 204. For example, scale 206 may correspond to a portable mini digital scale (e.g., Superior I-2000 portable digital scale, Wewdigi® digital scale, TOP2KG, etc.). In one embodiment, the weight is obtained for each package as each package is placed on cargo holder 204. In situations in which a package is already placed on cargo holder 204, when a new package is placed on cargo holder 204, the weight of the pre-existing packages on cargo holder 204 is then subtracted from the total weight of the packages on cargo holder 204 in order to obtain the weight of the newly added package on cargo holder 204. In one embodiment, the weight obtained from scale 206 for each package placed on cargo holder 204 may be transmitted to package delivery system 105.

Additionally, in one embodiment, programs 309 of drone 101 include a program for calculating the center of gravity position of each package placed in cargo holder 204. In one embodiment, the center of gravity position of a package is determined by taking the sum of the average value of the weight/volume times the distance times the volume segment divided by the weight. As previously discussed, the weight is obtained from scale 206. In one embodiment, the volume is obtained from the dimensions (length, width and height) of the package, which are obtained from visual recognition system 305.

In one embodiment, the dimensions, shape, weight, and center of gravity position of a package (collectively referred to as the "package information") is acquired by drone 101 from analyzing the package as discussed above. Such package information may be transmitted to package delivery system 105, such as via wireless transceiver 304.

In operation 602, package identifier 401 of package delivery system 105 receives the package information from multiple drones 101 delivering packages to a same destination (e.g., same residence location) within a duration of time, which may be user-designated.

As previously discussed, drones 101 are configured to analyze each package to be delivered to a destination (e.g., home residence) to obtain package information, including the dimensions, shape, weight, and center of gravity position of the package. Such package information is transmitted to package identifier 401 of package delivery system 105. In one embodiment, such package information further includes the destination (e.g., location in warehouse, home residence) for the package to be delivered. In one embodiment, such a destination is associated with an identifier, which is used by package identifier 401 to determine which packages are to be delivered to which destination, including an expected day (and possibly time) of delivery. In one embodiment, such an identifier is provided to drone 101 by the service provider, who is responsible for sending the package to a customer location. In one embodiment, such delivery information is stored in a data structure (e.g., table). As a result, package identifier 401 is able to determine which packages are to be delivered at the same destination, including on the same day, by searching through such a data structure. In one embodiment, such a data structure is stored in the storage device (e.g., storage device 511, 515) of package delivery system 105.

In one embodiment, upon receipt of such information, package identifier 401 associates such package information to each package to be delivered to a particular destination within a certain period of time (e.g., same day). As a result, package identifier 401 determines the set of packages (e.g., five packages) to be delivered to the same destination (e.g., particular home residence) within a period of time (e.g., same day). In one embodiment, package identifier 401 stores such information, such as the package information for each package to be delivered at the same destination within a period of time (e.g., same day), in a data structure (e.g., table). In one embodiment, such a data structure is stored in a storage device (e.g., storage device 511, 515) of package delivery system 105.

In operation 603, simulator 402 of package delivery system 105 performs simulations of stacking packages using different approaches based on the received package information.

As discussed above, in one embodiment, simulator 402 performs different simulations of stacking the packages to be delivered at the same particular destination (e.g., particular home residence) by drones 101 within a duration of time, which may be user-designated, based on package information received from drones 101. Such simulations may involve various approaches to stacking the packages. For example, simulator 402 may perform simulations of piling the packages to be delivered at the same destination in a different order (e.g., package #4 is placed on the pile of packages prior to stacking package #5 on the pile of packages versus placing package #5 on the pile of packages prior to stacking package #4 on the pile of packages) and in a different manner (e.g., stacking package #2 on the left-hand corner of package #1 versus stacking package #2 on the right-hand corner of package #1, etc.). In one embodiment, simulator 402 utilizes various software tools, including, but not limited to, Simio®, FlexSim®, aPriori®, SIMUL8®, Vensim®, ExtendSim®, etc.

Based on simulating the various approaches of stacking the packages to be delivered at the same destination, optimizing engine 403 of package delivery system 105 determines the optimal arrangement of stacking the packages at the destination in a particular order and in particular manner (e.g., place package #6 on the top center of package #4) by drones 101 within a duration of time (e.g., within five hours) that maximizes the stability in the pile of packages (i.e., prevents the collapse of such piled packages). In one embodiment, the stability of the pile of packages is determined using progressive collapse analysis. In one embodiment, progressive collapse analysis is performed by simulator 402 using various software tools, including, but not limited to, Extreme Loading®. In one embodiment, such analysis involves basing a "collapse" on lateral displacement analysis, which involves engineering judgement-based predefined limits. For example, there are various predefined limits as to how far a first package placed on a second package can extend beyond the border of the second package without collapsing (falling down) based on the width of such first and second packages. In one embodiment, the particular way of stacking the packages that results in the highest score for stability (i.e., preventing the collapse of such piled packages within the predefined limits) corresponds to the optimal arrangement for the pile of packages.

In one embodiment, simulator 402 utilizes the finite element method to enforce equilibrium on each point of a pile of packages, where the dimensions and shapes of the simulated pile of packages correspond to the dimensions and shapes as provided in the package information for such packages. Particles of each of the piled packages are free to separate from one another, which is advantageous in the simulation of collapsing the piled packages. In one embodiment, the finite element method is performed using a three-dimensional finite particle model using Matlab®.

In one embodiment, in connection with simulating the various approaches of stacking the packages to be delivered at the same destination, simulator 402 determines how close the center of gravity position for each package is to the center of each package(s) upon which it resides (except for those residing on the ground). As previously discussed, the center of gravity position of a package is the point at which the weight of the package is concentrated. This is the center point from which the weight is evenly dispersed on all the sides. As a result, the center of gravity position determines exactly when the package will reach its tipping point and fall over.

In one embodiment, in each of the simulations performed by simulator 402, a line is drawn straight down from the center of gravity position of the package. The package is tilted while keeping the line pointed vertically down from the center of gravity position at all times. The line will allow simulator 402 to determine the moment the center of gravity passes past the base of the package. This is the point at which the package has reached its tipping point and will fall over.

In operation 604, optimizing engine 403 of package delivery system 105 identifies the optimal arrangement of stacking the packages in a particular order and in a particular manner by drones 101 within the duration of time that maximizes the stability in the resulting arrangement of the pile of packages based on the simulations of operation 603.

As discussed above, in one embodiment, optimizing engine 403 assigns a score to each simulated arrangement based on the stability of each arrangement. That is, optimizing engine 403 assigns a score to each simulated arrangement based on how far the center of gravity position for each package in the piled set of packages is to passing the base (bottom-center) of the package. The further away that the center of gravity position is from passing the base of the package, the less likely that package will fall over. The greater the number of packages where it is not likely for its center of gravity to pass the base of the package, the higher the score thereby indicating a greater stability in such an arrangement.

In one embodiment, the arrangement that has been assigned the highest score is selected as corresponding to the optimal arrangement (i.e., the arrangement of the pile of packages to occur when the packages are delivered at the destination). In order to implement such an arrangement of the pile of packages, such packages need to be delivered in a particular order (e.g., package #2 is to be delivered prior to package #3) and in particular manner (e.g., package #5 placed on the top middle of package #3). Such an order and manner is determined based on the simulation of the identified optimal arrangement. For example, the simulation of the optimal arrangement that was performed by simulator 402 may include the order in which the packages are delivered, including the manner in stacking such packages. For instance, the simulation may indicate that the largest package should be first delivered and form the base of the pile of packages. The simulation may further indicate the next package to be delivered and in what manner (e.g., placed on the center-right of the first package) it should be placed on the previously placed package and so forth. In such a manner, the optimal arrangement of the pile of packages may be perfected.

In operation 605, instructing engine 404 of package delivery system 105 instructs drones 101 to deliver packages to the same destination within the duration of time (e.g., five hours) in a particular order and in a particular manner based on the identified optimal arrangement of stacking the packages.

As previously discussed, in order to implement such an arrangement of the pile of packages, such packages need to be delivered in a particular order and in particular manner (e.g., package #5 placed on the top middle of package #3). In one embodiment, instructing engine 404 instructs drones 101 to deliver packages to the same destination within a duration of time in such a particular order and in such a particular manner in order to implement such an arrangement.

A further discussion regarding drones 101 delivering packages based on such instructions is provided below in connection with FIG. 7.

FIG. 7 is a flowchart of a method 700 for having each drone 101 ensure the stability in the arrangement of the piled packages at the destination in accordance with an embodiment of the present disclosure.

Referring to FIG. 7, in conjunction with FIGS. 1-6, in operation 701, drones 101 receive instructions from instructing engine 404 to deliver a package(s) during a particular window of time in a particular manner as discussed above in connection with operation 605.

In operation 702, drones 101 receive an image of the arrangement of packages to be present at the time of delivering the package(s) at the destination.

As stated above, in one embodiment, for each of the drones 101 (with the exception of the first drone 101 to deliver a package to the destination) that is being utilized to deliver the packages to the destination, instructing engine 404 provides an image of the arrangement of the pile of packages that should exist at the destination prior to delivering the package(s) at the destination. Such an image is based on the simulation of the optimal arrangement of the pile of packages, in which such a simulation indicates the arrangement of the packages as each drone 101 drops off its package(s).

In operation 703, drone 101, such as drone 101 that will be delivering the next package at the destination, captures the image of the current arrangement of the pile of packages at the destination, such as via camera 301, prior to delivering the package(s) at the destination, which is transmitted to package delivery system 105.

In operation 704, instructing engine 404 of package delivery system 105 receives the captured image of the current arrangement of the pile of packages at the destination.

In operation 705, instructing engine 404 of package delivery system 105 determines if the current arrangement of the pile of packages at the destination differs from the arrangement of the packages to be present at the time of delivering the package(s) at the destination.

Alternatively, in one embodiment, drone 101 determines if the current arrangement of the pile of packages at the destination differs from the arrangement of the packages to be present at the time of delivering the package(s) at the destination, where the arrangement of the packages to be present at the time of delivering the package(s) at the destination is based on the image received in operation 702.

If there is a difference, then, in operation 706, instructing engine 404 of package delivery system 105 instructs drone 101 to rearrange the pile of packages, such as via robotic arms 207, to correspond to the arrangement of the packages to be present at the time of delivering the package(s) at the destination, such as based on the image received in operation 702. In one embodiment, such rearrangement may include removing obstacles, keeping an uneven space empty, utilizing smaller packages to fill-in gaps between packages, utilizing large and bulky packages on the lower or bottom level of the stack of packages, changing an orientation of a package, etc.

Alternatively, in one embodiment, drone 101 makes the determination if the current arrangement of the pile of packages at the destination differs from the arrangement of the packages to be present at the time of delivering the package(s) at the destination (based on image received in operation 702). If there is a difference, drone 101 automatically rearranges the pile of packages, such as via robotic arms 207, to correspond to the arrangement of the packages to be present at the time of delivering the package(s) at the destination.

If, however, the current arrangement of the pile of packages at the destination does not differ from the arrangement of the packages to be present at the time of delivering the package(s) at the destination, or upon rearranging the pile of packages to correspond to the arrangement of the packages to be present at the time of delivering the package(s) at the destination, in operation 707, instructing engine 404 of package delivery system 105 instructs drone 101 to proceed to deliver the package(s) at the destination in the instructed manner (e.g., drop package #6 on the middle of package #4).

In operation 708, drone 101 captures the image of the arrangement of the pile of packages at the destination, such as via camera 301, after delivering the package(s) at the destination, which is transmitted to package delivery system 105. For example, an image of the arrangement of the pile of packages at the destination after delivering the package(s) at the destination may be captured by drone 101 via camera 301.

In operation 709, instructing engine 404 of package delivery system 105 receives the captured image of the arrangement of the pile of packages at the destination from drone 101 after drone 101 delivers the package(s) at the destination for further assessment. In one embodiment, such further assessment may entail performing additional simulations to confirm that the remaining packages should be placed in the previously identified order and manner in order to maximize stability. If an adjustment needs to be made in order to maximize the stability in the pile of packages that are left at the destination, then instructing engine 404 issues such updated instructions (e.g., update instruction to drone 101B to now place package #6 on the top middle of package #4 as opposed to the left-hand corner of package #3) to drone(s) 101 responsible for delivering the remaining packages at the destination.

In operation 710, instructing engine 404 of package delivery system 105 transmits the captured image of the arrangement of the pile of packages at the destination after drone 101 delivers the package(s) at the destination to the customer, such as the customer who received such packages at the destination.

As discussed above, such information may be provided to computing device 104 via various electronic means, including e-mail or text message. In one embodiment, the information provided to computing device 104 may include instructions for picking up which packages and in what order in order to prevent the collapse of the pile of packages. In one embodiment, such instructions may be augmented reality based guidance in which computer generated information enables the simulation of picking up the packages in a particular order and in a particular manner in order to prevent the collapse of the pile of packages. In one embodiment, such augmented reality based guidance is based on the simulation corresponding to the identified optimal arrangement for stacking the packages at the destination in which the order and manner for picking up the packages is in the opposite sequence of the order and manner in stacking the packages.

As a result of the foregoing, embodiments of the present disclosure provide a means for enabling drones to deliver and stack/pile packages in a stable manner whereby the collapse of such piled packages is prevented.

Furthermore, the principles of the present disclosure improve the technology or technical field involving delivery drones. As discussed above, drones can be used to transport medicinal products, such as blood products, vaccines, pharmaceuticals, and medical samples. For example, drones may be used to transport medicinal products into remote or otherwise inaccessible regions. Furthermore, drones have been proposed as a solution for rapidly delivering prepared foods, such as pizzas, tacos, and frozen beverages. Additionally, drones are starting to be used to deliver packages. As the use of drones for delivering packages to consumers from online stores, brick & mortar stores, restaurants, etc. becomes more ubiquitous, the issue of having packages stacked in an unstable manner may become an issue. For example, if multiple drones are piling the packages at a particular destination (e.g., porch of a customer), such drones should ensure the stability of the piled or stacked packages. If the packages are not stacked in a stable manner, then the piled packages may collapse resulting in damage to the contents (e.g., products) of such packages. Furthermore, when the piled packages collapse, such collapsed packages run the risk of being mishandled by the customer. Unfortunately, there is not currently a means for ensuring that such packages delivered by the drones are piled in a manner that prevents the collapse of such piled packages.

Embodiments of the present disclosure improve such technology by receiving package information concerning packages to be delivered by multiple drones at the same destination within a duration of time (e.g., five hours) from such drones. Package information may include the dimensions, shape, weight, and center of gravity position for each package to be delivered at the destination. Upon receipt of such information, simulations are performed of stacking the packages using different approaches based on the received package information. In one embodiment, various simulations are performed in which each simulation stacks the packages to be delivered at the destination in a different order and in a different manner (e.g., package #2 stacked on the left-hand corner of package #1, package #2 stacked on the right-hand corner of package #1, etc.). Based on simulating the various ways of stacking the packages to be delivered at the destination, the optimal arrangement of stacking the packages at the destination in a particular order and in a particular manner by the drones within the duration of time that maximizes the stability in the resulting arrangement of the pile of packages (i.e., prevents the collapse of such piled packages) is identified. In one embodiment, such an optimal arrangement involves delivering such packages in a particular order (e.g., deliver box #3 after delivering box #2) and in particular manner (e.g., place box #6 on the right corner of box #4 and on the left corner of box #2) that maximizes the stability of the pile of packages (i.e., prevents the collapse of such piled packages). The drones scheduled to deliver the packages to such a destination are then instructed to deliver such packages to the destination in a particular order and in a particular manner based on the identified optimal arrangement of stacking the packages. In this manner, drones are able to deliver and stack/pile packages in a stable manner whereby the collapse of such piled packages is prevented. Furthermore, in this manner, there is an improvement in the technical field involving delivery drones.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for ensuring stability in an arrangement of a pile of packages delivered by drones, the method comprising:
  receiving package information from the drones delivering a plurality of packages to a destination within a duration of time;
  performing simulations of stacking the plurality of packages using different approaches based on the received package information, wherein the simulations comprise simulations of piling the plurality of packages in a different order and in a different manner, wherein the simulations utilize a finite element method to enforce equilibrium on each point of a pile of the plurality of packages, wherein dimensions and shapes of the simulated pile of packages correspond to dimensions and shapes in the package information for the plurality of packages;

performing progressive collapse analysis in determining stability of different arrangements of the simulated piling of the plurality of packages;

identifying an arrangement of stacking the plurality of packages in a particular order and in a particular manner by the drones within the duration of time that maximizes the stability in a resulting arrangement of a pile of the plurality of packages based on the simulations; and assigning a score to each simulated arrangement based on how far a center of gravity position for each package in the pile of the plurality of packages is to passing a base of the package, wherein the identified arrangement of stacking the plurality of packages corresponds to the simulated arrangement associated with a highest score; and instructing the drones to deliver the plurality of packages to the destination within the duration of time in the particular order and in the particular manner based on the identified arrangement of stacking the plurality of packages thereby enabling the drones to deliver and pile the plurality of packages in a stable manner which thereby prevents a collapse of the piled plurality of packages.

2. The computer-implemented method as recited in claim 1, wherein the package information comprises dimensions, a shape, a weight, and a center of gravity position.

3. The computer-implemented method as recited in claim 1 further comprising:

determining how close a center of gravity position for each package in the simulated pile of packages is to a center of each package upon which it resides; and utilizing a line drawn straight down from the center of gravity position of the package to determine a moment the center of gravity passes past a base of the package which corresponds to when the package has reached its tipping point.

4. The computer-implemented method as recited in claim 1, wherein the simulations utilize a finite element method to enforce equilibrium on each point of a pile of the plurality of packages, wherein dimensions and shapes of the simulated pile of packages correspond to dimensions and shapes in the package information for the plurality of packages, further comprising:

performing progressive collapse analysis in determining stability of different arrangements of the simulated piling of the plurality of packages.

5. The computer-implemented method as recited in claim 1 further comprising:

receiving a captured image of an arrangement of a pile of packages at the destination from a drone after delivering a package at the destination; and transmitting the captured image of the arrangement of the pile of packages at the destination to a customer.

6. The computer-implemented method as recited in claim 1, wherein the package information of a package of the plurality of packages is obtained from a drone analyzing dimensions, a shape, a weight, and a center of gravity position of the package.

7. A computer program product for ensuring stability in an arrangement of a pile of packages delivered by drones, the computer program product comprising one or more computer readable storage mediums having program code embodied therewith, the program code comprising programming instructions for:

receiving package information from the drones delivering a plurality of packages to a destination within a duration of time;

performing simulations of stacking the plurality of packages using different approaches based on the received package information, wherein the simulations comprise simulations of piling the plurality of packages in a different order and in a different manner, wherein the simulations utilize a finite element method to enforce equilibrium on each point of a pile of the plurality of packages, wherein dimensions and shapes of the simulated pile of packages correspond to dimensions and shapes in the package information for the plurality of packages;

performing progressive collapse analysis in determining stability of different arrangements of the simulated piling of the plurality of packages;

identifying an arrangement of stacking the plurality of packages in a particular order and in a particular manner by the drones within the duration of time that maximizes the stability in a resulting arrangement of a pile of the plurality of packages based on the simulations; and assigning a score to each simulated arrangement based on how far a center of gravity position for each package in the pile of the plurality of packages is to passing a base of the package, wherein the identified arrangement of stacking the plurality of packages corresponds to the simulated arrangement associated with a highest score; and instructing the drones to deliver the plurality of packages to the destination within the duration of time in the particular order and in the particular manner based on the identified arrangement of stacking the plurality of packages thereby enabling the drones to deliver and pile the plurality of packages in a stable manner which thereby prevents a collapse of the piled plurality of packages.

8. The computer program product as recited in claim 7, wherein the package information comprises dimensions, a shape, a weight, and a center of gravity position.

9. The computer program product as recited in claim 7, wherein the program code further comprises the programming instructions for:

determining how close a center of gravity position for each package in the simulated pile of packages is to a center of each package upon which it resides; and utilizing a line drawn straight down from the center of gravity position of the package to determine a moment the center of gravity passes past a base of the package which corresponds to when the package has reached its tipping point.

10. The computer program product as recited in claim 7, wherein the simulations utilize a finite element method to enforce equilibrium on each point of a pile of the plurality of packages, wherein dimensions and shapes of the simulated pile of packages correspond to dimensions and shapes in the package information for the plurality of packages, wherein the program code further comprises the programming instructions for:

performing progressive collapse analysis in determining stability of different arrangements of the simulated piling of the plurality of packages.

11. The computer program product as recited in claim 7, wherein the program code further comprises the programming instructions for:
   receiving a captured image of an arrangement of a pile of packages at the destination from a drone after delivering a package at the destination; and
   transmitting the captured image of the arrangement of the pile of packages at the destination to a customer.

12. The computer program product as recited in claim 7, wherein the package information of a package of the plurality of packages is obtained from a drone analyzing dimensions, a shape, a weight, and a center of gravity position of the package.

13. A system, comprising:
   a memory for storing a computer program for ensuring stability in an arrangement of a pile of packages delivered by drones; and
   a processor connected to the memory, wherein the processor is configured to execute program instructions of the computer program comprising:
   receiving package information from the drones delivering a plurality of packages to a destination within a duration of time;
   performing simulations of stacking the plurality of packages using different approaches based on the received package information, wherein the simulations comprise simulations of piling the plurality of packages in a different order and in a different manner, wherein the simulations utilize a finite element method to enforce equilibrium on each point of a pile of the plurality of packages, wherein dimensions and shapes of the simulated pile of packages correspond to dimensions and shapes in the package information for the plurality of packages;
   performing progressive collapse analysis in determining stability of different arrangements of the simulated piling of the plurality of packages;
   identifying an arrangement of stacking the plurality of packages in a particular order and in a particular manner by the drones within the duration of time that maximizes the stability in a resulting arrangement of a pile of the plurality of packages based on the simulations; and
   assigning a score to each simulated arrangement based on how far a center of gravity position for each package in the pile of the plurality of packages is to passing a base of the package, wherein the identified arrangement of stacking the plurality of packages corresponds to the simulated arrangement associated with a highest score; and
   instructing the drones to deliver the plurality of packages to the destination within the duration of time in the particular order and in the particular manner based on the identified arrangement of stacking the plurality of packages thereby enabling the drones to deliver and pile the plurality of packages in a stable manner which thereby prevents a collapse of the piled plurality of packages.

14. The system as recited in claim 13, wherein the package information comprises dimensions, a shape, a weight, and a center of gravity position.

15. The system as recited in claim 13, wherein the program instructions of the computer program further comprise:
   determining how close a center of gravity position for each package in the simulated pile of packages is to a center of each package upon which it resides; and
   utilizing a line drawn straight down from the center of gravity position of the package to determine a moment the center of gravity passes past a base of the package which corresponds to when the package has reached its tipping point.

16. The system as recited in claim 13, wherein the simulations utilize a finite element method to enforce equilibrium on each point of a pile of the plurality of packages, wherein dimensions and shapes of the simulated pile of packages correspond to dimensions and shapes in the package information for the plurality of packages, wherein the program instructions of the computer program further comprise:
   performing progressive collapse analysis in determining stability of different arrangements of the simulated piling of the plurality of packages.

17. The system as recited in claim 13, wherein the program instructions of the computer program further comprise:
   receiving a captured image of an arrangement of a pile of packages at the destination from a drone after delivering a package at the destination; and
   transmitting the captured image of the arrangement of the pile of packages at the destination to a customer.

\* \* \* \* \*